(12) United States Patent
Kern (10) Patent No.: US 10,521,425 B2
(45) Date of Patent: Dec. 31, 2019

(54) GENERATING FASTER AND EFFICIENT DATABASE QUERY EXECUTION PLANS

(71) Applicant: SAP SE, Walldorf (DE)

(72) Inventor: Thomas Kern, Wiesloch (DE)

(73) Assignee: SAP SE, Walldorf (DE)

( * ) Notice: Subject to any disclaimer, the term of this patent is extended or adjusted under 35 U.S.C. 154(b) by 647 days.

(21) Appl. No.: 15/252,401

(22) Filed: Aug. 31, 2016

(65) Prior Publication Data

US 2018/0060390 A1     Mar. 1, 2018

(51) Int. Cl.
  *G06F 17/30* (2006.01)
  *G06F 16/2453* (2019.01)
  *G06F 16/2455* (2019.01)

(52) U.S. Cl.
  CPC .... *G06F 16/24542* (2019.01); *G06F 16/2455* (2019.01); *G06F 16/24539* (2019.01)

(58) Field of Classification Search
  CPC ......... G06F 16/24542; G06F 16/24539; G06F 16/2455
  USPC ....................................................... 707/718
  See application file for complete search history.

(56) References Cited

U.S. PATENT DOCUMENTS

| | | | | |
|---|---|---|---|---|
| 6,360,213 | B1* | 3/2002 | Wagstaff | G06F 16/284 |
| 2003/0097354 | A1* | 5/2003 | Finlay | G06F 16/2228 |
| 2003/0187858 | A1* | 10/2003 | Kirk | G06F 16/24545 |
| 2004/0243555 | A1* | 12/2004 | Bolsius | G06F 16/2462 |
| 2009/0030883 | A1* | 1/2009 | Das | G06F 16/24542 |
| 2012/0005190 | A1* | 1/2012 | Faerber | G06F 16/2433 707/718 |
| 2014/0172908 | A1* | 6/2014 | Konik | G06F 16/951 707/769 |
| 2015/0363447 | A1* | 12/2015 | Dickie | G06F 16/24578 707/696 |
| 2016/0342655 | A1* | 11/2016 | Mishra | G06F 16/22 |

* cited by examiner

*Primary Examiner* — Shiow-Jy Fan
(74) *Attorney, Agent, or Firm* — Jones Day (57) ABSTRACT

A computer-implemented method of generating faster and more efficient database query execution plans includes receiving a database query, generating an optimized query execution plan, and initiating execution of the optimized plan. Database can include table columns with associated column dictionaries. Database query can have statements with conditions. Generating the optimized query execution plan involves comparing contents of a column dictionary semantics of the statements, omitting statements which will always be TRUE and omitting conditions which will always be FALSE. Related apparatus, systems, techniques, methods and articles are also described.

18 Claims, 7 Drawing Sheets

```
SELECT (fieldlist) FROM MaterialMaster LEFT OUTER JOIN
ProcurementCustomizing
    ON MaterialMaster.FashionProcurement =
        ProcurementCustomizing.ProcurementKey
```

```
SELECT (fieldlist) FROM MaterialMaster
    WHERE IndustrySetting = 'Fashion'
```

```
SELECT
    Case DeliveryMethod
        When 'Fashion1' Then ...
        When 'Fashion2' Then ...
        When 'Automotive1' Then ...
        When 'Automotive2' Then ...
    Endcase
From OrderCustomizing ....
```

GENERATING FASTER AND EFFICIENT DATABASE QUERY EXECUTION PLANS

TECHNICAL FIELD

The subject matter described herein relates to database query execution plans and optimizing the structure of such plans.

BACKGROUND

General purpose query execution plans are written to provide a solution in multiple situations such as various industries, geographic regions, financial markets, and business processes. Query execution plans are typically written in a database language such as SQL. These database languages are based on statements that are evaluated in combination with database tables. Only limited ways to optimize the runtime of the query execution plans are available. Two known approaches are to take into account the statistics about table sizes, and to take into account the statistics about table indexes. Even with these known approaches, query execution plans is slow and inefficient.

SUMMARY

In a first aspect, a database query is received for a database that has a plurality of table columns each with an associated dictionary. The database query includes a plurality of statements that, in turn, include at least one condition. Thereafter, an optimized query execution plan is generated for the database query by comparing contents of a dictionary associated with a table column implicated by the database query with semantics of the plurality of statements, omitting, based on the comparing, statements which will always be TRUE, and omitting, based on the comparing, conditions which will always be FALSE. Subsequently, execution of the optimized query can be initiated.

Generating faster and more efficient database query execution plans can include any one, or several, of the following features: generating an initial query execution plan based on the received database query, collecting a frequency of change of the dictionary representing stability of data in a database, selecting table columns from columns having the frequency of change of the dictionary below a predetermined frequency. The optimized query execution plan can be based on the generated initial query execution plan. Table columns can be selected from table columns containing fewer dictionary entries than a predetermined threshold, or from tables containing a number of rows less than a pre-defined threshold. Tables can be selected from master data tables and customizing data tables.

Database query can be to generate a materials requirements plan. The optimized query execution plan can be saved into a plan cache. The plan cache can be invalidated when the dictionary changes. The optimized query plan can be executed. Results responsive to the executed optimized query plan can be provided to a remote computing system.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. One advantage is that query execution plans run faster. The shorter runtime of query execution plans may be an important business advantage, especially for business critical queries, such as materials resource planning (MRP). Another advantage is that query execution plans become more efficient. Higher efficiency of query execution plans may result in significant cost savings related to better utilization of computational assets (e.g., processing resources, memory consumption, etc.).

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Structured Query Language (SQL) is a special purpose programming language for handling data stored in a database management system. SQL script is a computer program written in SQL and is typically intended for manipulating data in multiple databases with a purpose of creating an execution plan.

A database management system may contain a database or multiple databases. Each database may be represented as a table or a set of tables, each table containing data in rows and columns. Data in a table may be stored by rows. The corresponding database is then called a row database. Data in a table may also be stored by columns. A corresponding database is then called a column database or a columnar database. One example of a database management system is SAP HANA®. SAP HANA® is an in-memory, columnar, relational database management system The content of the database may be indexed. This means that for each row of a row database or for each column of a columnar database, there is an index of data contained in that row or that column. In a columnar database, such index may be called a dictionary, which is a list of all data entries for that column.

There are advantages to storing a database as a columnar database rather than a row database. One such advantage is that column dictionaries of a columnar database are smaller than row indexes of a row database. As an example, a table may contain a list of products, with one row for each product, and columns for that product's characteristics. There may be hundreds or thousands of rows in a table, or more. However, there usually are fewer characteristics associated with each product, and each characteristic may assume even fewer different values. For example, in a typical industrial database, product's characteristics may include name, physical attributes (e.g., weight, color, size) with corresponding units of measure for these physical attributes, relevant dates (e.g., arrival, sale, shipment dates), and financial data (e.g., cost and price) with currency units. A row index for such database will include all these parameters, for each row. Therefore, such index may be as large as the database itself. On the other hand, a dictionary for some columns may contain only one or two entries. For example, all costs and prices may be in U.S. Dollars. In this case, a dictionary for the column of the currency units will contain only one entry. In another example, the product color may be only black and white. In this case, a dictionary for the column of product color will only contain two entries.

When a database query is received, an SQL script is applied to a database management system and an execution plan is created. A complexity of a resulting execution plan depends on the content of the SQL script and on the content of databases in the database management system. How efficient and how fast the resulting execution plan will be depends on how extensive the SQL script is, on the number of databases, and on how large these databases are.

SQL scripts are typically written in such a way that the same script can be applied to a wide variety of database management systems. This approach allows to create efficient, well-written, robust SQL scripts that are broadly applicable to many different database management systems. However, such SQL scripts are long and complex. Furthermore, depending on the content of the database management system, some portions of such SQL scripts may be not relevant for some database management systems.

SQL script consists of statements or expressions, where each statement or expression is an instruction or a set of instructions on what changes to make to a database management system. Some statements contain conditions. Depending on a database to which a SQL script applies, some statements may always be TRUE. In such case, the execution plan would be optimized if such statements were omitted. Some conditions may always be FALSE. In such case, the execution plan would be optimized if such conditions were omitted.

The nature of a SQL script is such that each statement in the script must be evaluated during the creation of an execution plan, even if data which this statement is supposed to manipulate does not exist in a given database management system. This may result in execution plans that are slow and inefficient, because such execution plans would still have to go through evaluating all statements that are TRUE, and checking all conditions that are FALSE. However, knowledge of an index for rows of a row database, or of a dictionary for columns of a columnar database, may help eliminate unnecessary calculations and will result in a fast and efficient execution plan.

Figure 1:
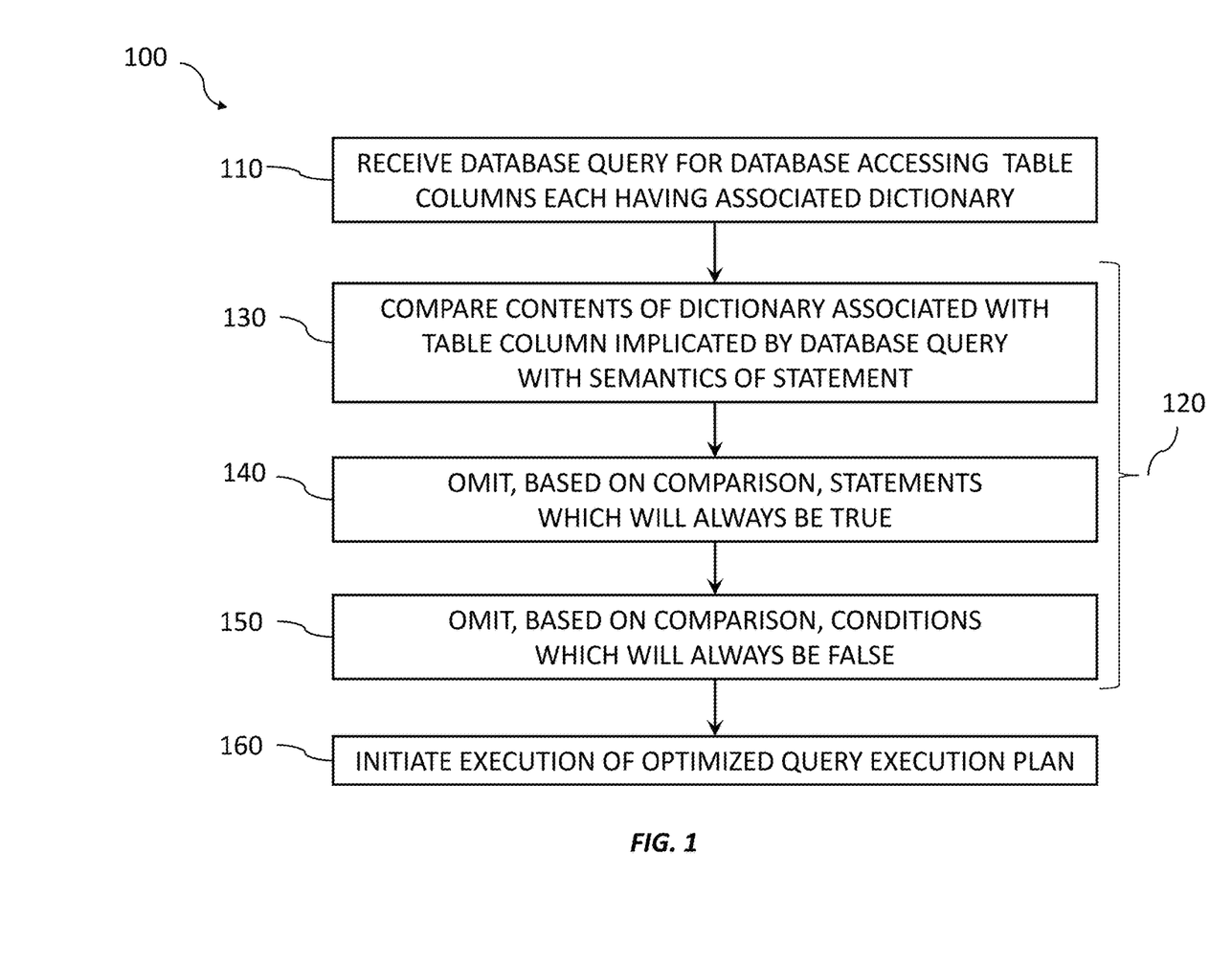
FIG. 1 is a process flow diagram illustrating an example of generation of faster and efficient database query execution plans.

Referring to FIG. 1, a method 100 of generating faster and efficient query execution plans is described. In step 110, a database query for a database is received. The database may have a plurality of table columns each with an associated dictionary. The database query may have a plurality of statements, and some of the statements may have conditions. In step 120, an optimized execution plan for the database query is generated. Step 120 includes steps 130, 140, and 150. In step 130, contents of a dictionary associated with a table column implicated by the database query is compared with semantics of the statements in a database query. Statements that will always be TRUE are identified. Conditions that will always be FALSE are also identified. In step 140, statements which will always be TRUE are omitted from the execution plan. In step 150, conditions which will always be FALSE are omitted from the execution plan. In step 160, execution of the optimized query execution plan, generated in step 120, is initiated.

Figure 2:
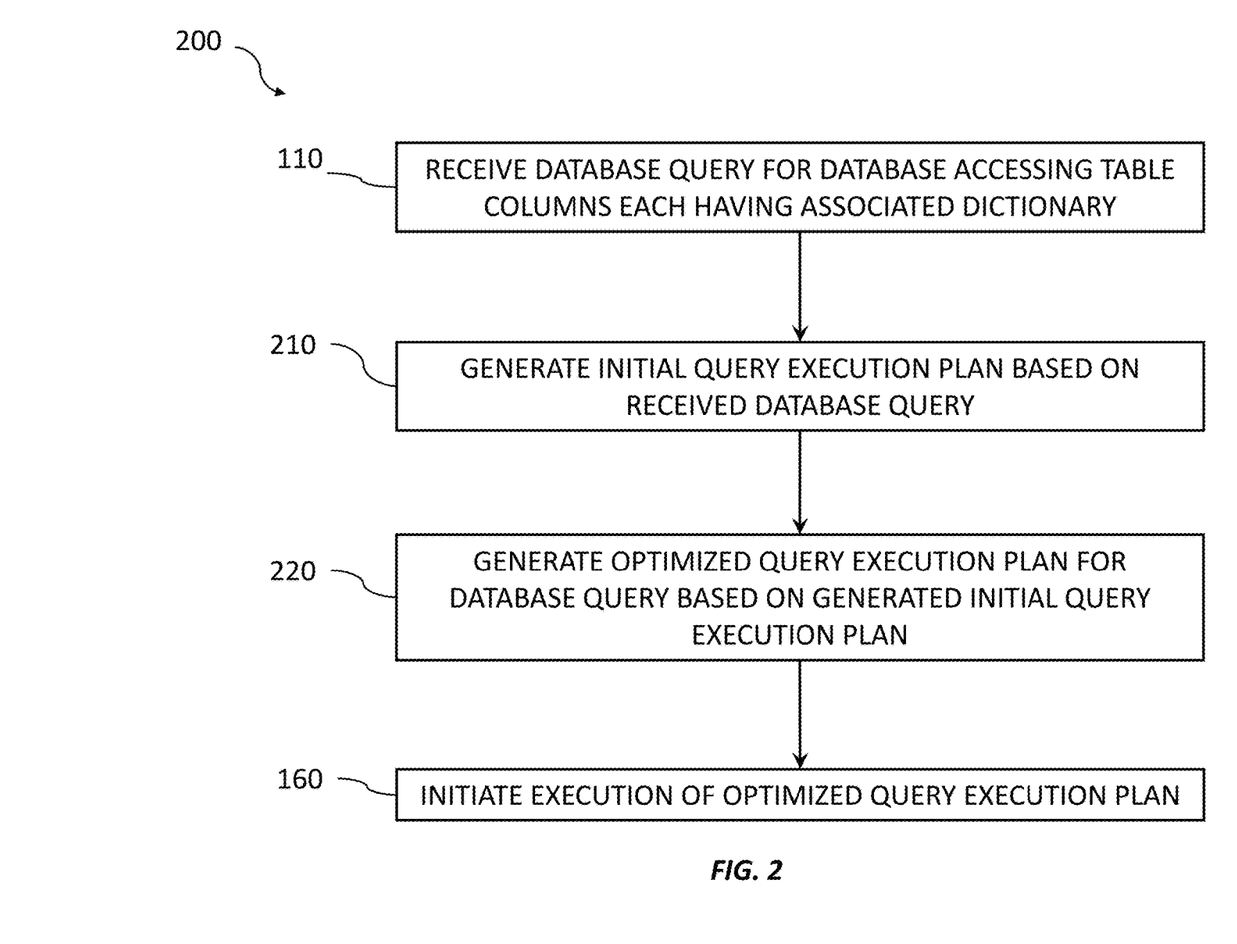
FIG. 2 is a process flow diagram illustrating another example of generation of faster and efficient database query execution plans.

Referring to FIG. 2, a method 200 of generating faster and efficient query execution plans is described. Step 110 is the same as described previously in reference to FIG. 1 and involves receiving a database query for a database. In step 210, an initial query execution plan is generated based on the received database query. In step 220, an optimized query execution plan for the database query is generated, based on the generated initial query execution plan. Step 160 is the same as described previously in reference to FIG. 1 and involves initiation of execution of the optimized query execution plan, but here it is the optimized query execution plan generated in step 220.

Figure 3:
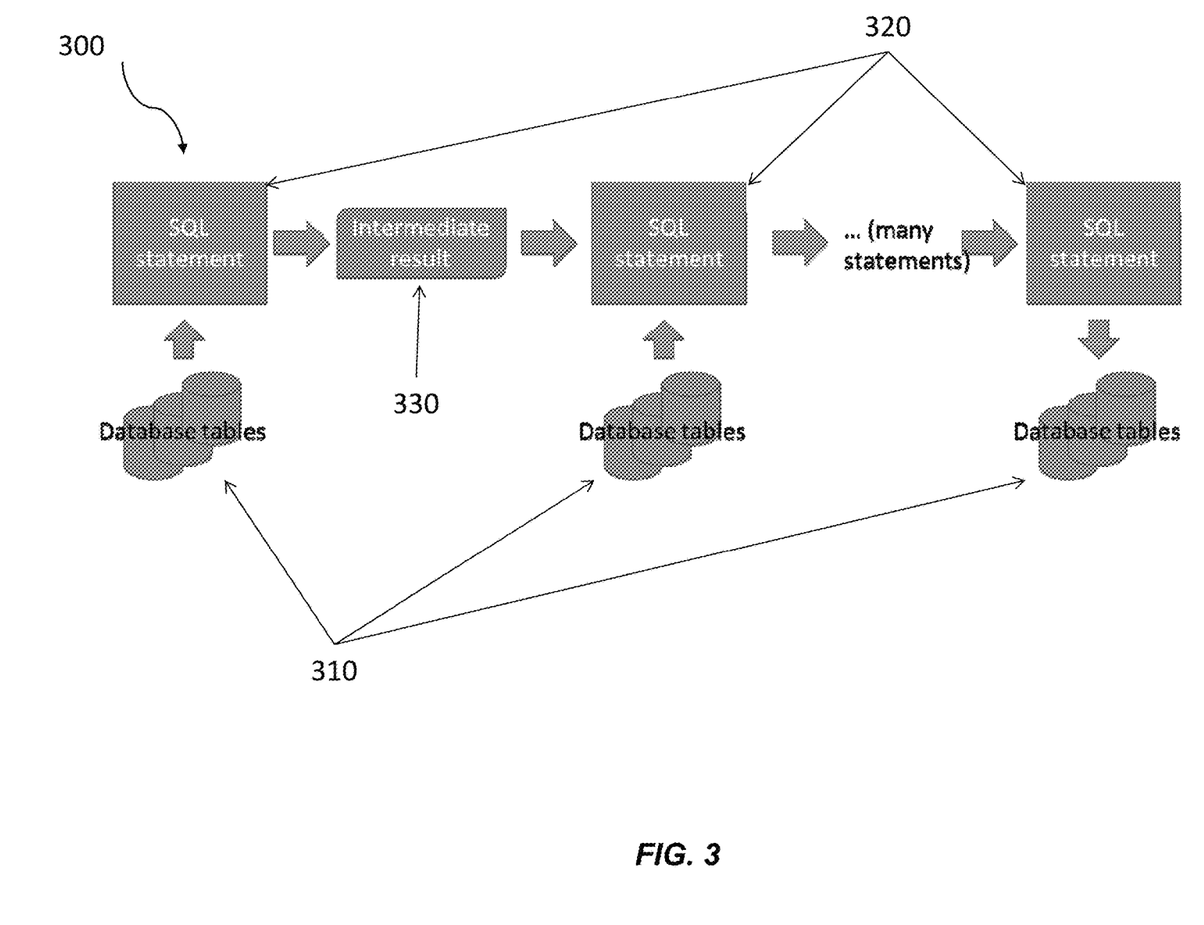
FIG. 3 is an illustration of an example of the sequence of operations in developing a query execution plan.

FIG. 3 describes an example of a typical database query 300. In some variations, database query 300 can involve a database management system containing multiple database tables 310. In some variations, SQL script statements 320 can read data from database tables 310. In some variations, SQL script statements 320 can produce intermediate results 330. In some variations, final SQL statement can write modified data back into the database tables. In some variations, query result can be displayed on a user interface. In some variations, query result can be used as an input to another process.

Figure 4:
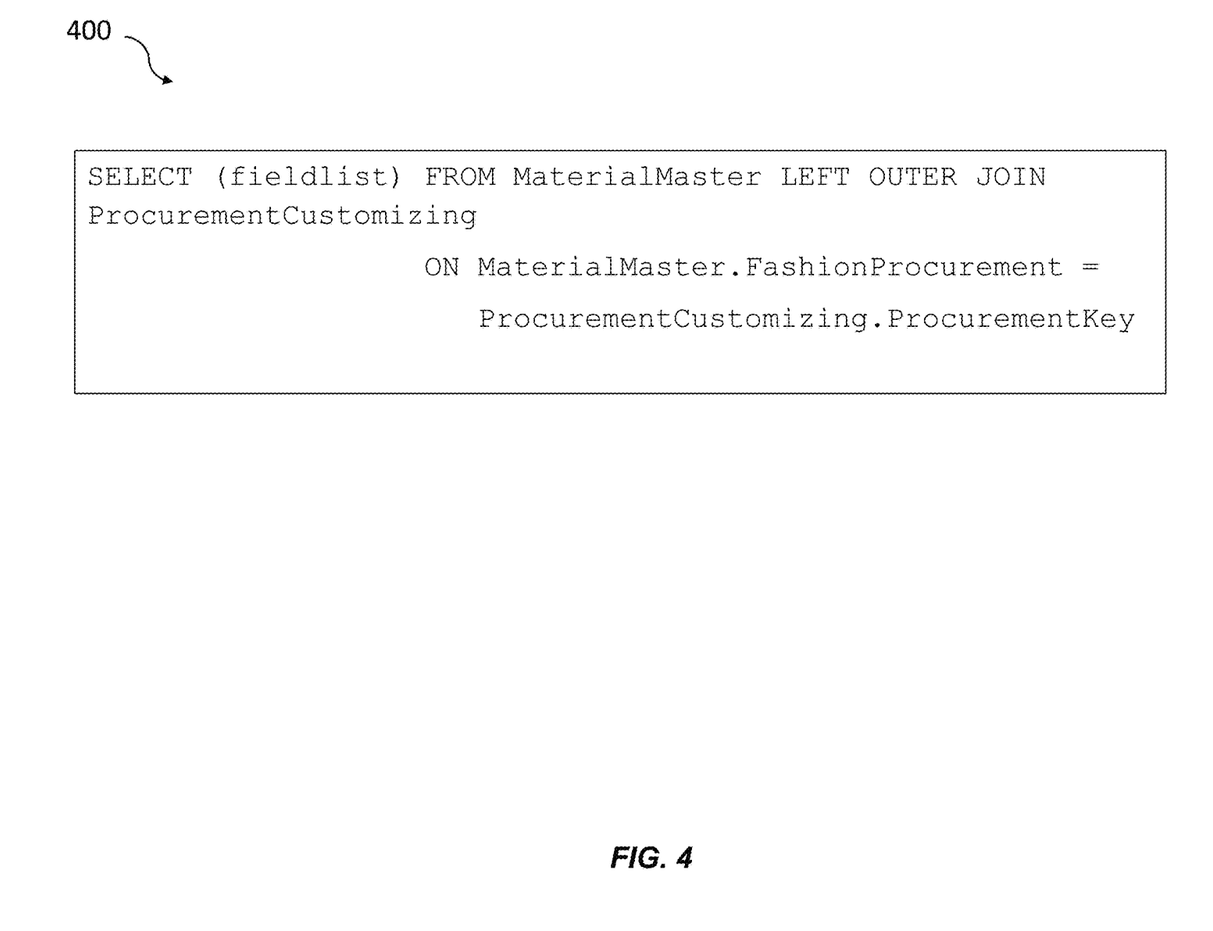
FIG. 4 is an example of a statement with a JOIN condition.
Figure 5:
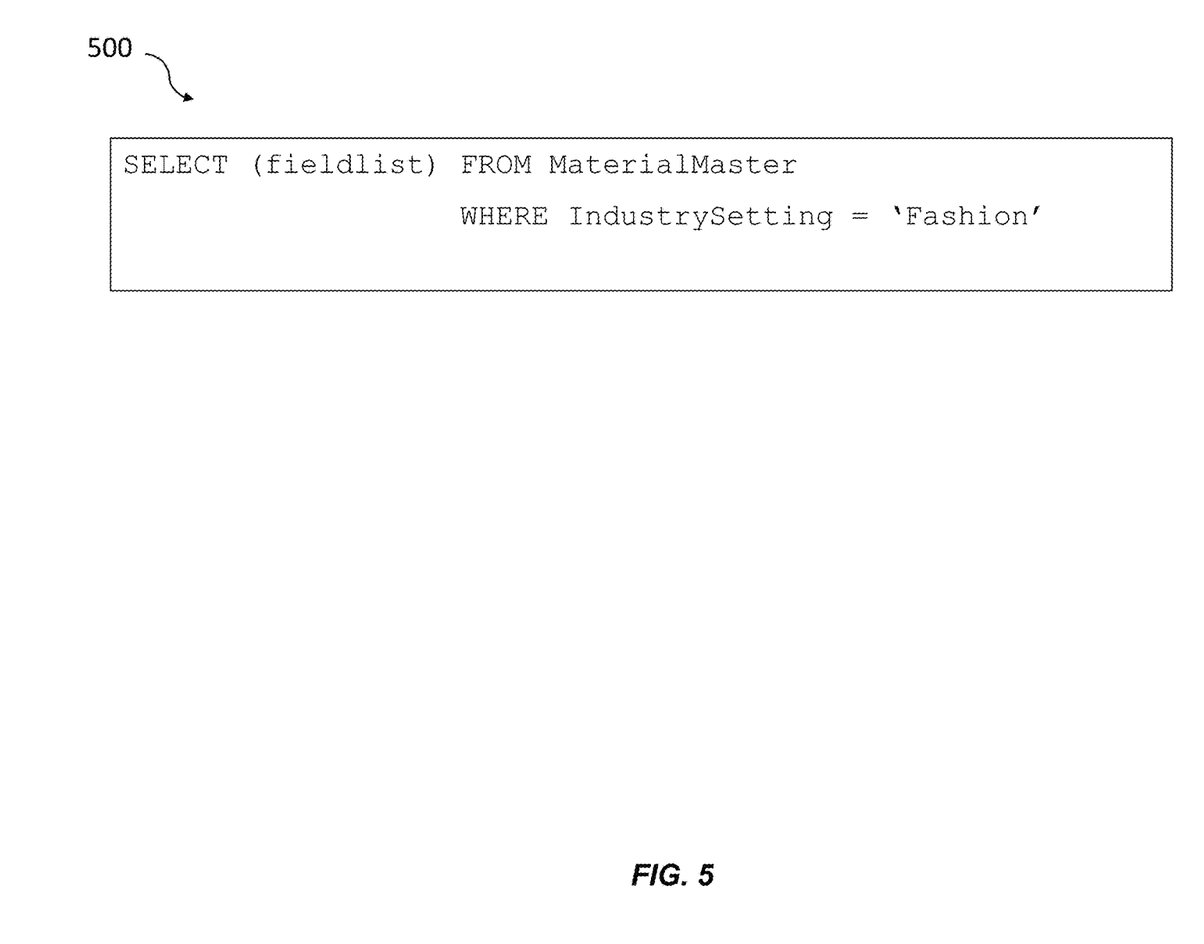
FIG. 5 is an example of a statement with a WHERE condition.
Figure 6:
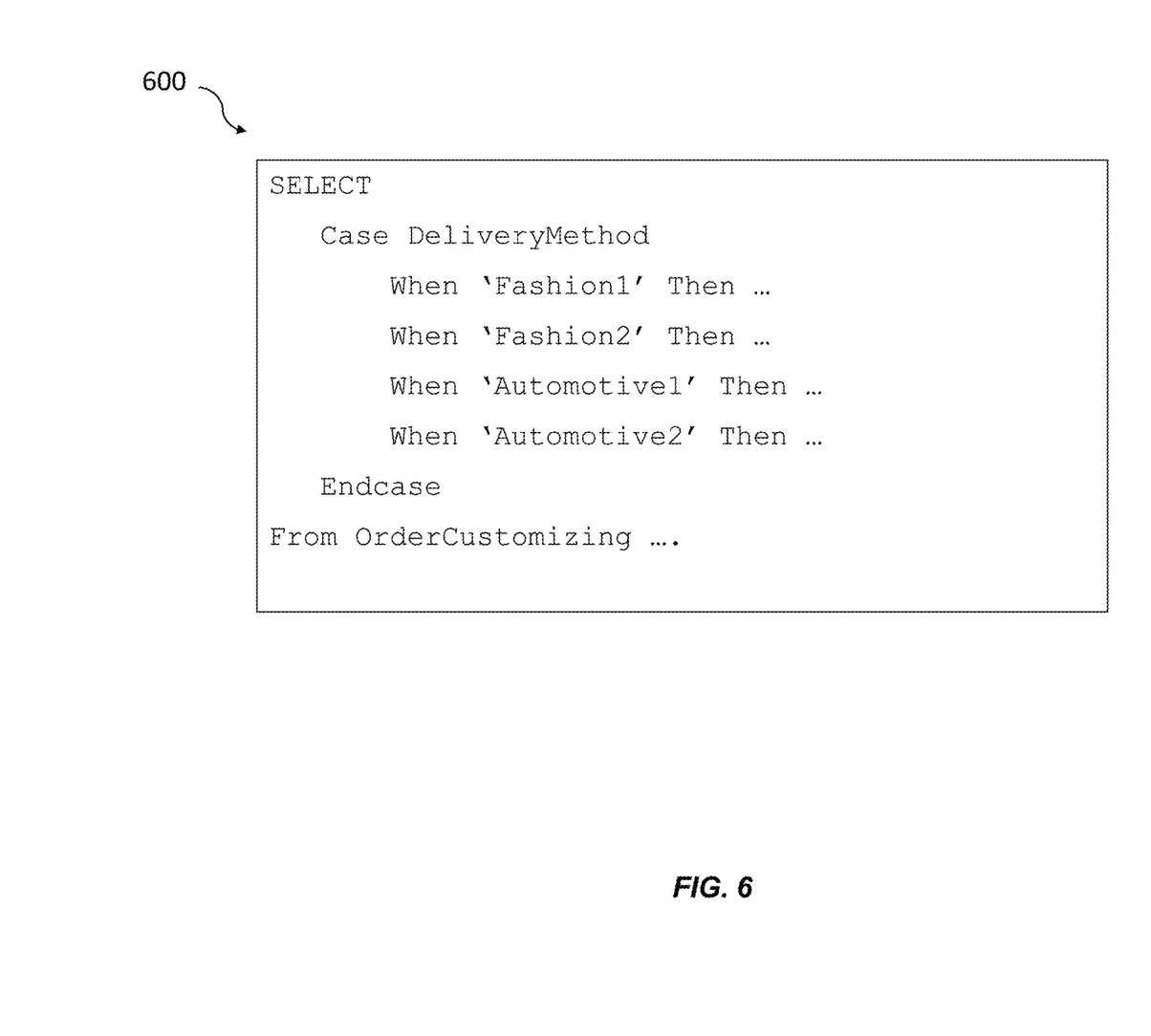
FIG. 6 is an example of a CASE-WHEN expression.

FIGS. 4, 5, and 6 describe schematic examples of SQL statements. These examples are based on SQL scripts for material requirements planning (MRP). The task of the MRP run is to create procurement proposals for relevant materials. The range of businesses covered by the MRP run comprises many industries, many different ways of procuring supply, and many different ways of producing materials in the supply chain. The examples in FIGS. 4, 5, and 6 involve statements that may apply to both automotive industry and fashion industry.

A statement 400 described in FIG. 4 is a SELECT statement with a JOIN condition. When a query is executed in an automotive industry setting, table ProcurementCustomizing typically does not contain any entries for Fashion Procurement, and column FashionProcurement in table MaterialMaster contains only NULL values or initial values. Because MaterialMaster.FashionProcurement does not contain any meaningful values, the left outer join to table ProcurementCustomizing can be omitted completely, because it will never yield any hits. It is always FALSE.

A statement 500 described in FIG. 5 is a SELECT statement with a WHERE condition. When a query is executed in an automotive industry setting, table MaterialMaster, column IndustrySetting does not contain value 'Fashion.' Because MaterialMaster.IndustrySetting does not contain value 'Fashion', the WHERE condition will never be TRUE and the whole statement can be excluded from the execution plan. In some cases, all consecutive statements relying on the intermediate table filled by this statement may also be removed.

Figure 7:
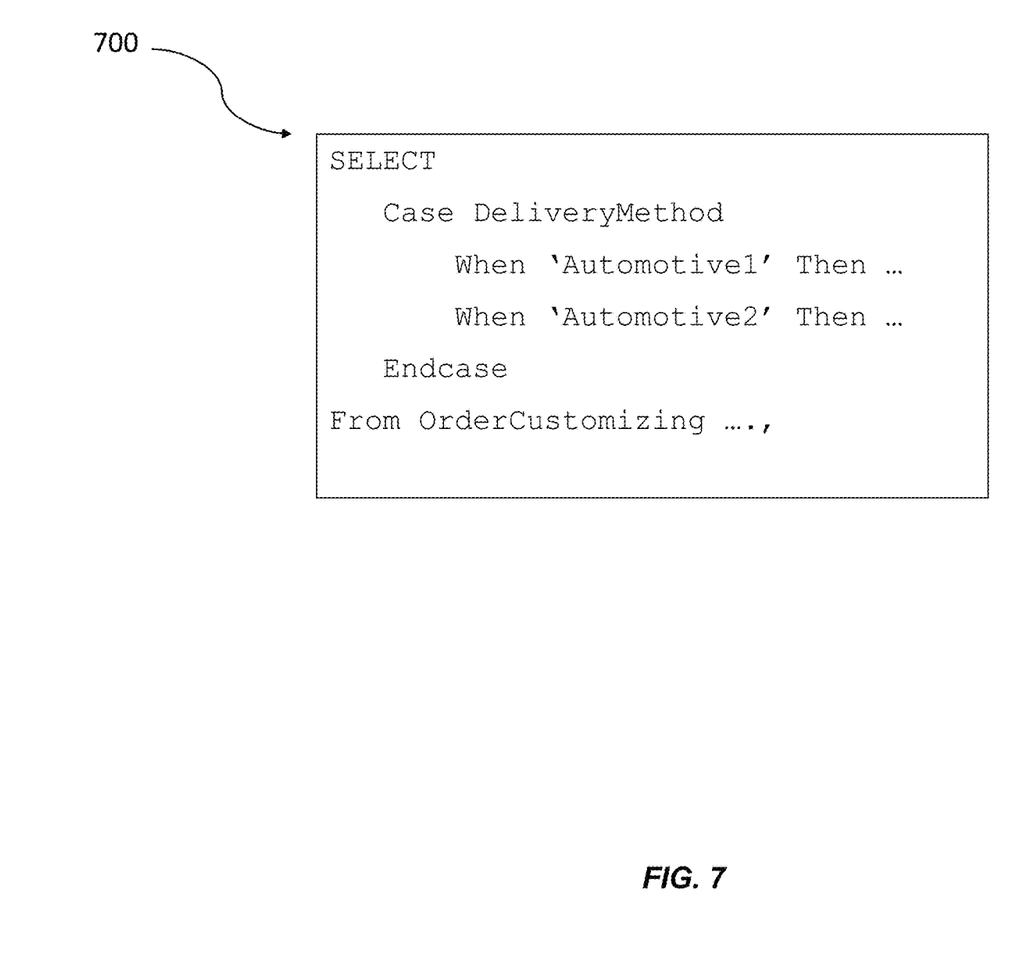
FIG. 7 is an execution equivalent of an optimized CASE-WHEN statement from an example in FIG. 6.

A statement 600 described in FIG. 6 is a CASE-WHEN condition. When a query is executed in an automotive industry setting, field DeliveryMethod in table OrderCustomizing does not contain values 'Fashion1' and 'Fashion2', but only values 'Automotive1' and 'Automotive2.' Since the 'Fashion1' and 'Fashion2' values are not present, the relevant WHEN conditions (or branches) will never be TRUE and may be omitted. FIG. 7 illustrates the resulting statement 700 obtained from statement 600 of FIG. 6 after the fashion industry related conditions have been omitted.

The process of omitting unnecessary statements and conditions is assisted by an index of a database, and especially by a dictionary of a columnar database. In automotive industry examples above, all columns representing industry will not have dictionary entry for "Fashion." Therefore, when contents of a dictionary for that column is compared with semantics of statements in the database query, it would be possible to easily identify those statements that will always be TRUE and omit them and those conditions that will always be FALSE and omit them.

Once the unnecessary statements and condition are removed, the resulting execution plan will be more efficient and will run faster than the initial, non optimized, execution plan. This is because the time that would otherwise be spent on executing these statements and conditions, and computer resources that would otherwise be allotted for the execution of these statements and conditions, will not be wasted.

These savings of time and resources may be further increased by applying the optimization step 120 of FIG. 1 selectively. Not all columns of a database table will yield the same degree of optimization. For example, if the number of entries in a dictionary for a given column is too high, the savings from optimization may be offset by time and resources spent on comparing the dictionary to the semantics of the statements in a database query. Therefore, in some variations the table columns are selected from table columns containing fewer dictionary entries than a predetermined threshold. In some variations, a predetermined threshold may be between 1 and 100. In some variations, a predetermined threshold may be between 1 and 20. In some variations, a predetermined threshold may be between 1 and 5.

An indirect indication of how many entries a column dictionary will have is a number of rows in a table. While it is not a direct measure of the size of a columnar dictionary, it has an advantage of being the same for all columns of a table, and therefore it does not need to be evaluated for each column individually. Therefore, a number of rows in a table may be a useful measure to limit the number of tables submitted for optimization. In some variations, the table columns can be selected from tables containing a number of rows less than a pre-defined threshold. For example, the predetermined threshold can be between 1 and 100,000, or 1 and 10,000, or 1 and 1,000.

The database tables can be categorized into suitable for optimization and not suitable for optimization. For example, only columns from those database tables that are suitable for optimization can be included in the optimization. Typically, database tables may be categorized in one of the following three categories: transactional data, master data, and customizing data. Transactional data (like customer orders) includes tables changing frequently and typically containing a large number of rows. Columns of these tables may contain many distinct values. Master data (like material master) includes tables changing rarely and containing a few to many rows. Only few columns of these tables (like the key columns and some attributes like weight or price) contain many distinct values, and most columns contain only a few distinct values. Master data tables typically reference customizing data tables. Customizing data includes tables changing rarely and containing a few rows. They describe how business processes are executed. In some variations, the table columns can be selected from master data tables and customizing data tables or just customizing data tables.

Not all database tables will yield the same degree of optimization. For example, if data in a database table changes often from one run to the next, the savings from optimization may be offset by time and resources spent on re-optimizing the execution plan for every execution query. Such offset would be larger when data changes more frequently. To minimize such offset and to maximize savings, in some variations the table columns are selected from columns having the frequency of change of the dictionary below a predetermined frequency. In some variations, a predetermined threshold may be once per day. In some variations, a predetermined threshold may be once per week. In some variations, a predetermined threshold may be once per month.

In some variations, the database query is tailored to particular industrial processes. In some variations, the database query is to generate an enterprise resource plan (ERP). In some variations, the database query is to generate a materials requirements plan (MRP).

In some variations, the optimized query execution plan is saved into a plan cache. In some variations, plan cache is invalidated when the columnar dictionary changes. In some variations, plan cache is invalidated when the columnar dictionary for a column that was involved in optimization changes. In these variations, data changes in columns and tables that were not involved in optimization will not invalidate the cached plan.

In some variations, the optimized query plan is executed after being generated. In some variations, results responsive to the executed optimized query plan are provided to a remote computing system.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving, for a database having a plurality of table columns each with an associated dictionary, a database query having a plurality of statements, the plurality of statements comprising at least one condition;
   generating an optimized query execution plan for the database query by:
      selecting, from table columns implicated by the database query, a table column containing fewer dictionary entries than a predetermined threshold;
      comparing contents of a dictionary associated with the selected table column with semantics of the plurality of statements;
      omitting, based on the comparing, statements which will always be TRUE; and
      omitting, based on the comparing, conditions which will always be FALSE; and
   initiating execution of the optimized query execution plan.

2. The method of claim 1, further comprising:
   generating an initial query execution plan based on the received database query;
   wherein the optimized query execution plan is based on the generated initial query execution plan.

3. The method of claim 1, further comprising:
   collecting a frequency of change of the dictionary representing stability of data in a database; and
   selecting the table column from columns having the frequency of change of the dictionary below a predetermined frequency.

4. The method of claim 3, wherein the table is selected from master data tables and customizing data tables.

5. The method of claim 4, wherein the table is selected from tables containing a number of rows less than a predefined threshold.

6. The method of claim 1, wherein the database query is to generate a materials requirements plan.

7. The method of claim 1, further comprising:
   saving the optimized query execution plan into a plan cache;
   invalidating the plan cache when the dictionary changes.

8. The method of claim 1, further comprising:
   executing the optimized query plan; and
   providing results, responsive to the executed optimized query plan, to a remote computing system.

9. A computer system to customize software configuration, comprising:
   a memory to store a database having a plurality of table columns each with an associated dictionary; and
   a processor to
      receive, for the database having the plurality of table columns, a database query having a plurality of statements, the plurality of statements comprising at least one condition;
      generate an optimized query execution plan for the database query by:
         selecting, from table columns implicated by the database query, a table column containing fewer dictionary entries than a predetermined threshold;
         comparing contents of a dictionary associated with the selected table column with semantics of the plurality of statements;
         omitting, based on the comparing, statements which will always be TRUE; and
         omitting, based on the comparing, conditions which will always be FALSE; and
      initiate execution of the optimized query execution plan.

10. The computer system of claim 9, wherein the processor generates an initial query execution plan based on the received database query, and wherein the optimized query execution plan is based on the generated initial query execution plan.

11. The computer system of claim 9, wherein the memory stores a frequency of change of the dictionary representing stability of data in a database and wherein a processor selects the table column from columns having the frequency of change of the dictionary below a predetermined frequency.

12. The computer system of claim 11, wherein the table is selected from master data tables and customizing data tables.

13. The computer system of claim 12, wherein the table is selected from tables containing a number of rows less than a pre-defined threshold.

14. The computer system of claim 9, wherein the database query is to generate a materials requirements plan.

15. The computer system of claim 9, wherein the processor saves the optimized query execution plan into a plan cache and invalidates the plan cache when the dictionary changes.

16. The computer system of claim 9, wherein the processor executes the optimized query plan and provides results, responsive to the executed optimized query plan, to a remote computing system.

17. A computer-implemented method comprising:
receiving a database query for a database having an at least one table, the database query having a plurality of statements, the plurality of statements comprising at least one condition;
generating an index for the at least one table;
generating an optimized query execution plan for the database query by:
  selecting, from tables implicated by the database query, a table containing fewer index entries than a predetermined threshold;
  comparing contents of the index associated with the selected table with semantics of the plurality of statements;
  omitting, based on the comparing, statements which will always be TRUE; and
  omitting, based on the comparing, conditions which will always be FALSE; and
initiating execution of the optimized query execution plan.

18. The method of claim 17, further comprising:
generating an initial query execution plan based on the received database query;
wherein the optimized query execution plan is based on the generated initial query execution plan.

* * * * *